United States Patent
Morisaki et al.

(10) Patent No.: US 9,327,603 B2
(45) Date of Patent: May 3, 2016

(54) VEHICLE EQUIPPED WITH REGENERATIVE GENERATOR

(71) Applicant: TOYOTA JIDOSHA KABUSHIKI KAISHA, Toyota-shi (JP)

(72) Inventors: Keisuke Morisaki, Miyoshi (JP); Kouji Hokoi, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 58 days.

(21) Appl. No.: 14/326,907

(22) Filed: Jul. 9, 2014

(65) Prior Publication Data

US 2015/0019057 A1 Jan. 15, 2015

(30) Foreign Application Priority Data

Jul. 11, 2013 (JP) ................. 2013-145815

(51) Int. Cl.
*B60L 9/00* (2006.01)
*B60L 7/18* (2006.01)
(Continued)

(52) U.S. Cl.
CPC ... *B60L 7/18* (2013.01); *B60L 7/14* (2013.01); *B60L 11/126* (2013.01); *B60L 11/14* (2013.01); *B60L 11/1816* (2013.01); *B60L 15/20* (2013.01); *B60W 10/08* (2013.01); *B60W 20/1062* (2013.01); *B60L 2240/12* (2013.01); *B60L 2240/622* (2013.01); *B60L 2250/16* (2013.01); *B60L 2250/26* (2013.01); *B60L 2260/20* (2013.01); *B60L 2260/32* (2013.01); *B60L 2260/52* (2013.01); *B60L 2260/54* (2013.01); *B60W 2540/04* (2013.01); *Y10S 903/947* (2013.01)

(58) Field of Classification Search
CPC .......... B60W 20/00; B60W 2550/143; B60W 2550/402; B60W 10/06
See application file for complete search history.

(56) References Cited

U.S. PATENT DOCUMENTS 6,459,980 B1 * 10/2002 Tabata ..................... B60K 6/46
180/65.1
6,719,076 B1 * 4/2004 Tabata .................. B60K 31/00
180/65.7

(Continued)

FOREIGN PATENT DOCUMENTS

CN 102791555 A 11/2012
JP 2004-142686 A 5/2004

(Continued)

*Primary Examiner* — Redhwan K Mawari
(74) *Attorney, Agent, or Firm* — Kenyon & Kenyon LLP

(57) ABSTRACT

A vehicle includes a power storage unit, a regenerative generator, and an electronic control unit. The regenerative generator is connected to the power storage unit and is configured to perform regenerative power generation. The electronic control unit is configured to perform regeneration amount enlargement control in which positions of stopping and deceleration of the vehicle by input of driver's operations are predicted or set based on route information, regenerative power generation by the regenerative generator is controlled, and a regeneration power amount charged into the power storage unit is enlarged. The electronic control unit is configured to restrict the regeneration amount enlargement control when executing a predetermined vehicle speed adjustment mode by comparison with when the predetermined vehicle speed adjustment mode is not selected, the vehicle running with automatic adjustment of vehicle speed in the predetermined vehicle speed adjustment mode selected by intentional input from the driver.

8 Claims, 10 Drawing Sheets

(51) Int. Cl.
*B60L 15/20* (2006.01)
*B60L 7/14* (2006.01)
*B60L 11/12* (2006.01)
*B60L 11/14* (2006.01)
*B60L 11/18* (2006.01)
*B60W 10/08* (2006.01)
*B60W 20/00* (2016.01)

(56) References Cited

U.S. PATENT DOCUMENTS

| | | | | |
|---|---|---|---|---|
| 2007/0255477 | A1* | 11/2007 | Okuda | B60K 6/442 701/93 |
| 2008/0110684 | A1* | 5/2008 | Kaita | B60K 6/445 180/65.265 |
| 2011/0276209 | A1* | 11/2011 | Suganuma | B60W 10/06 701/22 |
| 2011/0313602 | A1* | 12/2011 | Hirata | B60K 6/365 701/22 |
| 2012/0330485 | A1* | 12/2012 | Tamagawa | B60K 6/46 701/22 |
| 2013/0046429 | A1* | 2/2013 | Tashiro | B60K 6/448 701/22 |
| 2013/0245866 | A1* | 9/2013 | Kuretake | B60L 7/10 701/22 |
| 2015/0019057 | A1* | 1/2015 | Morisaki | B60L 7/18 701/22 |

FOREIGN PATENT DOCUMENTS

| | | |
|---|---|---|
| JP | 2009-149137 A | 7/2009 |
| JP | 2010006216 A | 1/2010 |
| JP | 2010120552 A | 6/2010 |
| JP | 2011239605 A | 11/2011 |
| WO | 2012073373 A1 | 6/2012 |

* cited by examiner

VEHICLE EQUIPPED WITH REGENERATIVE GENERATOR

CROSS-REFERENCE TO RELATED APPLICATION

This application claims priority to Japanese patent application No. 2013-145815 filed Jul. 11, 2013, the entire contents of which are incorporated herein by reference.

BACKGROUND OF THE INVENTION

1. Field of the Invention

The invention relates to a vehicle equipped with a regenerative generator which is a generator connected to a power storage unit.

2. Description of Related Art

In a vehicle equipped with a regenerative generator, which performs regenerative power generation during braking of the vehicle, a method can be considered by which future stopping operations that will be performed by the driver are predicted on based on route information and control is performed to enlarge the regeneration power amount that can be charged into a power storage unit.

Japanese Patent Application Publication No. 2004-142686 (JP 2004-142686 A) describes a vehicle which has a cruise control function and in which control is performed to decelerate the vehicle automatically based on route information.

Where the control enlarging the regeneration power amount is performed, as mentioned hereinabove, based on route information when a predetermined vehicle speed adjustment mode in which the vehicle runs with automatic adjustment of vehicle speed is selected by the driver, as in the cruise control mode, the selection of the predetermined vehicle speed adjustment can be canceled and accidental deceleration unintended by the driver can occur. As a result, discomfort can be caused to the driver. Therefore, this discomfort is expected to be suppressed. JP 2004-142686 A discloses no means for improving such an inconvenience.

SUMMARY OF THE INVENTION

In view of the abovementioned problem, the invention provides a vehicle equipped with a regenerative generator in which the driver's discomfort can be suppressed when a predetermined vehicle speed adjustment mode, in which the vehicle runs with automatic adjustment of vehicle speed, is selected.

According to an aspect of the invention, there is provided a vehicle, the vehicle including a power storage unit, the regenerative generator, and an electronic control unit. The regenerative generator is connected to the power storage unit and configured to implement regenerative power generation. The electronic control unit is configured to (a) perform regeneration amount enlargement control in which positions of stopping and deceleration of the vehicle by input of driver's operations are predicted or set based on route information, the regenerative power generation by the regenerative generator being controlled in the regeneration amount enlargement control, a regeneration power amount charged into the power storage unit being enlarged in the regeneration amount enlargement control, and (b) restrict the regeneration amount enlargement control when executing a predetermined vehicle speed adjustment mode by comparison with when the vehicle speed adjustment mode is not selected, the vehicle running with automatic adjustment of vehicle speed in the predetermined vehicle speed adjustment mode selected by intentional input from the driver.

With the above-described vehicle equipped with a regenerative generator in accordance with the invention, the regeneration amount enlargement control when executing the predetermined vehicle speed adjustment mode is restricted by comparison with when the predetermined vehicle speed adjustment mode is not selected, in the predetermined vehicle speed adjustment mode selected by intentional input from the driver the vehicle running with automatic adjustment of vehicle speed. Therefore, the driver's discomfort occurring when the predetermined vehicle speed adjustment mode is selected can be suppressed.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
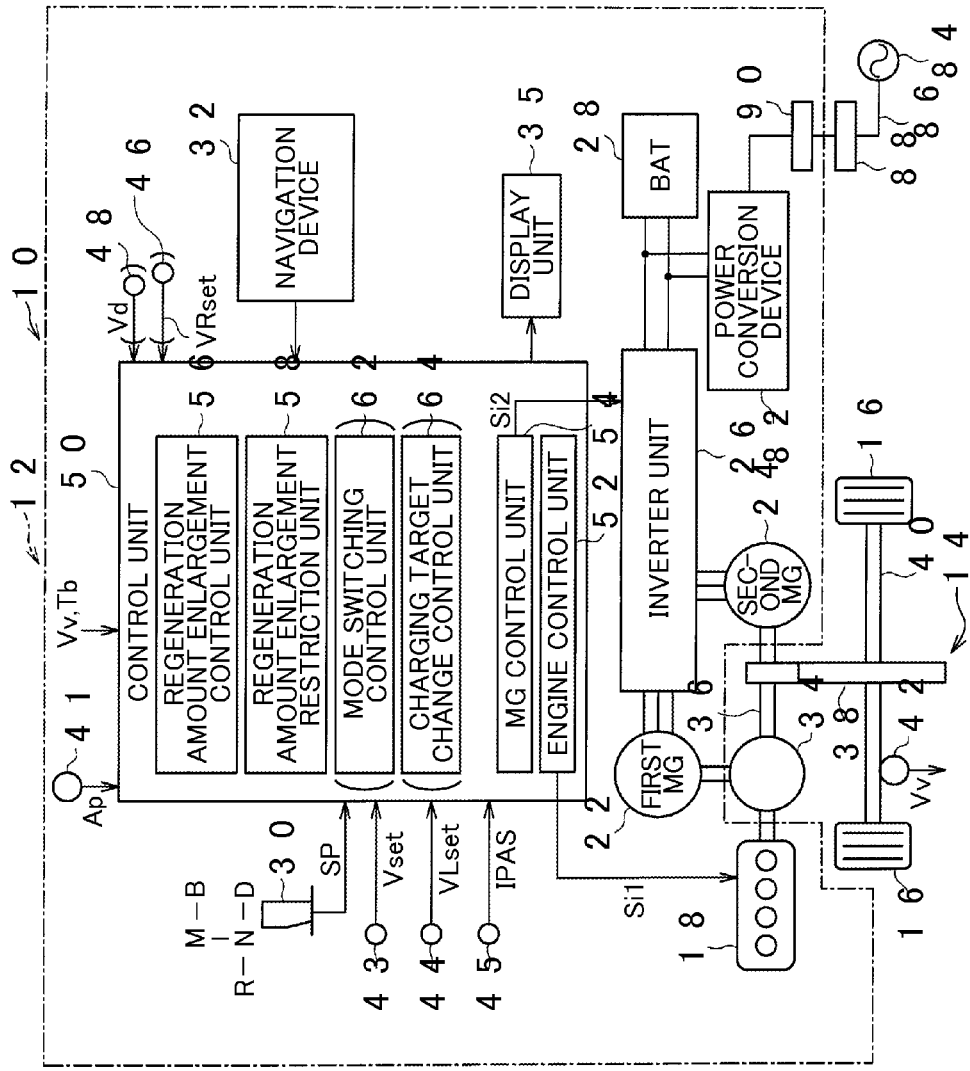
FIG. 1 is a schematic diagram of a hybrid vehicle, which is a vehicle equipped with a regenerative generator of an embodiment representing an example of the invention.

An embodiment of the invention will be explained below with reference to the drawings. In the case described hereinbelow, the vehicle equipped with a regenerative generator in accordance with the invention is a HV including a motor generator (MG), which is a regenerative generator and also has the function of an electric motor, and an engine, but it may also be a vehicle using a regenerative generator connected to the engine, instead of the MG. The vehicle may also be an electric automobile having a MG and no engine. Further, in the case explained hereinbelow, the HV is of a plug-in type having the function of charging from an external power source, but the HV may also have no charging function of a plug-in type. In the explanation of all of the drawings below, like elements are assigned with like reference numerals.

FIG. 1 shows the schematic configuration of a HV 10 of an embodiment of the invention. The HV 10 is provided with a control system 12. The control system 12 includes an engine 18, a first MG 22, a second MG 24, an inverter unit 26, a battery 28, which is a power storage unit, a shift lever 30, a navigation device 32, a display unit 35, and a control unit 50.

The HV 10 runs as a result of wheels 16 being driven by at least either of the engine 18 and the second MG 24. In the explanation below, the first MG 22 and the second MG 24 are described as "first MG 22" and "second MG 24", respectively.

The engine 18 is a gasoline engine or a diesel engine. The engine 18 is controlled by a control signal Si1 from the control unit 50.

The first MG 22 is a three-phase synchronous rotating electric machine and has a function of a generator that is driven by the engine 18 and generates power. In the power generation state of the first MG 22, at least part of the torque from the engine 18 is transmitted to the rotating shaft of the first MG 22 by the below-described power division mechanism 34. The power generated by the first MG 22 is supplied by the inverter unit 26 to the battery 28 and the battery 28 is charged.

The first MG 22 also has a function of an engine start motor that starts the engine 18 through the power division mechanism 34 when driven by the power supplied from the battery 28.

The second MG 24 is a three-phase synchronous rotating electric machine and is driven when the below-described EV mode is executed. The second MG 24 has a function of a motor that is driven by power from the battery 28 and generates drive power for the vehicle. The second MG 24 also has a function of a regenerative generator for power regeneration during braking. The power generated by the second MG 24 is also supplied to the below-described battery 28 through the inverter unit 26 and the battery 28 is charged. An induction rotating electric machine or separate rotating electric machines can be used as the first MG 22 and the second MG 24.

The power transmission mechanism 14 includes the power division mechanism 34, an output shaft 36 coupled to the power division mechanism 34, a reducer 38 coupled to the output shaft 36, and a wheel shaft 40. The power division mechanism 34 is constituted by a planetary gear mechanism. The planetary gear mechanism includes a sun gear, a pinion gear, a carrier, and a ring gear. For example, the sun gear is connected to the end of the hollow rotating shaft of the first MG 22. The carrier is connected to the drive shaft of the engine 18. The ring gear is connected to the output shaft 36. The output shaft 36 is connected, directly or through a gear reducer (not shown), to the rotating shaft of the second MG 24. The output shaft 36 is connected to the wheel shaft 40 coupled to the wheels 16 through the reducer 38. The power division mechanism 34 divides the power from the engine 18 between a path to the output shaft 36 and a path to the first MG 22.

The inverter unit 26 is connected between the battery 28 and two MGs, namely, the first MG 22 and the second MG 24. The inverter unit 26 includes a first inverter (not shown) connected between the first MG 22 and the battery 28 and a second inverter (not shown) connected between the second MG 24 and the battery 28. The inverter unit is controlled by a control signal Si2 from the control unit 50.

The first inverter converts the direct current (DC) voltage supplied from the battery 28 into an alternate current (AC) voltage, supplies the converted voltage to the first MG 22 and drives the first MG 22. Where the first MG 22 generates power as the engine 18 is driven, the first inverter demonstrates a function of converting the AC voltage obtained by such power generation into a DC voltage and supplying the converted DC voltage to the battery 28.

Likewise, the second inverter converts the DC voltage from the battery 28 into an AC voltage, supplies the converted voltage to the second MG 24, and drives the second MG 24. During the regenerative braking of the HV 10, the second inverter also demonstrates a function of converting the AC voltage regeneratively generated by the second MG 24 into a DC voltage and supplying the converted DC voltage to the battery 28. The operation of the inverters is controlled by the control signal Si2. In this case, the second MG 24 performs regenerative power generation, and a regenerative braking force is generated at the wheels 16 under the control of the regenerative torque of the second MG 24 performed by the below-described control unit 50. The second MG 24 can perform the regenerative power generation when the below-described accelerator pedal is not operated as the vehicle runs. A DC/DC converter may be connected between the first inverter, second inverter and the battery 28 for stepping up the voltage of the battery 28 and outputting the stepped-up voltage to the inverters, or for stepping down the voltage supplied from the inverters and supplying the stepped-down voltage to the battery 28.

The battery 28 is constituted by a nickel hydride battery or a lithium ion battery and connected to the first MG 22 and the second MG 24 through the first inverter or the second inverter. The battery 28 can supply electric power to the first MG 22 and the second MG 24 through the inverters. A battery current sensor (not shown) is mounted on the positive electrode side of the battery 28. The battery current sensor detects the charge-discharge current and transmits the detected value to the control unit 50. The control unit 50 calculates the state of charge (SOC), which is the residual charge amount of the battery 28, from the integrated value of the charge-discharge current.

The SOC may be calculated from the value detected by the voltage sensor that detects the voltage of the battery 28, or from the value detected by the battery current sensor. A capacitor can be also used as the power storage unit.

A power conversion device 82 has a function of converting the AC power from an external power source 84 into DC power, outputting the DC power to the battery 28, and charging the battery 28. The power conversion device 82 is controlled by a control signal from the control unit 50. In this case, when the vehicle is stopped, the battery 28 can be charged from the external power source 84 by connecting a connector 88 provided at a cable 86 connected to the external power source 84 to a connector 90 connected to the power conversion device 82.

An accelerator position sensor 41 detects an accelerator position AP that determines the operation amount of the accelerator pedal, and a signal representing the accelerator position AP is transmitted to the control unit 50.

A wheel speed sensor 42 detects a revolution speed Vv of the wheels 16 per unit time, and a signal representing the revolution speed Vv is transmitted to the control unit 50. The control unit 50 calculates a vehicle speed Vc based on the revolution speed Vv. The control unit 50 may also calculate the vehicle speed Vc based on the value detected by a second rotation sensor (not shown) that detects the revolution speed of the second MG 24.

The shift lever 30 can be switched by an operation to any one of R position, N position, D position, M position, and B position. The position of the shift lever 30 is detected by a position sensor (not shown), and a single representing the detected position is transmitted to the control unit 50. The D position corresponds to a D range mode which is a standard forward drive mode.

A cruise mode setting unit 43 is provided to select a cruise control mode, in which the vehicle speed is automatically adjusted, such that the actual vehicle speed matches the set vehicle speed that has been set by the driver. The cruise mode setting unit 43 sets the cruise control mode with a first lever (not shown) disposed on the periphery of a steering wheel. Switching between selection and deselection of the cruise control mode can be performed by switching ON or OFF a pushbutton switch provided at the distal end of the first lever. The cruise control mode is called a CR mode and the cruise mode setting unit 43 is called a CR mode setting unit 43.

A signal Vset representing an ON/OFF state in the CR mode setting unit 43 is transmitted to the control unit 50. Even when the CR mode setting unit 43 is ON, where the accelerator pedal or brake pedal is depressed, the CR mode selection is canceled.

Where the distal end portion of the first lever is operated to one side when the CR mode setting unit 43 is ON, a signal representing an instruction to increase the set vehicle speed is transmitted to the control unit 50, and where the distal end portion of the first lever is operated to the other side, a signal representing an instruction to decrease the set vehicle speed is transmitted to the control unit 50.

A vehicle speed upper limit adjustment unit 44 is provided for selecting an "automatic speed limiter (ASL) mode", which means a vehicle speed upper limit adjustment mode in which the upper limit of vehicle speed is automatically adjusted to match the upper limit of the actual vehicle speed with a set upper limit vehicle speed that has been set by the driver. The vehicle speed upper limit adjustment unit 44 sets the vehicle speed upper limit adjustment mode with a second lever (not shown) disposed on the periphery of the steering wheel. Switching between selection and deselection of the vehicle speed upper limit adjustment mode can be performed by switching ON or OFF a pushbutton switch provided at the distal end of the second lever.

A signal VLset representing an ON/OFF state in the vehicle speed upper limit adjustment unit 44 is transmitted to the control unit 50. Where the distal end portion of the second lever is operated to one side when the vehicle speed upper limit adjustment unit 44 is ON, a signal representing an instruction to increase the set upper limit vehicle speed is transmitted to the control unit 50, and where the distal end portion of the second level is operated to the other side, a signal representing an instruction to decrease the set upper limit vehicle speed is transmitted to the control unit 50. The first lever and the second lever may be constituted by a single common lever.

A parking assist setting unit 45 is provided for selecting an "intelligent parking assist (IPA) mode", which means a parking assist mode in which the wheels are automatically steered to guide the vehicle to the parking position desired by the driver. The parking assist setting unit 45 includes an image display unit that displays an image from a camera that is provided at the rear end of the vehicle and captures the image of the zone behind the vehicle, and operation reception means for receiving a touch operation performed by the driver in the image display unit. Where the shift lever is operated by the driver to the R position, the image display unit displays a switching unit. With the parking assist setting unit 45, the IPA mode ON/OFF can be switched by the driver performing a touch operation on the switching unit. The IPA mode is selected by switching the IPA mode ON, and the IPA mode is deselected by switching the IPA mode OFF.

The parking assist setting unit 45 may be also configured such that the IPA mode is switched ON when the shift lever is operated to the R position in a state in which the parking assist switch provided on the periphery of a driver's seat is switched ON by the driver. In another possible configuration, the IPA mode is switched ON by the ON operation of the parking assist switch when the shift lever is operated to the D position. An IPA signal (IPAS) representing an instruction relating to the ON/OFF state of the IPA mode is transmitted to the control unit 50. The image display unit may be common with the display unit of the below-described navigation device 32.

The navigation device 32 helps to drive the vehicle 10 to the destination and provides a travel route from the present position to the destination and a time required to reach the destination. The navigation device 32 acquires the present position from a global positioning system (GPS) sensor (not shown). The navigation device 32 stores road information including road grade information and legal speed limit, and route information including intersection position information, traffic signal position information, and temporary stopping position information, and specifies the present position on a map by comparing the present position with route information. The navigation device 32 acquires the destination information inputted by the user, and calculates the travel route and time required to reach the destination. The navigation device 32 acquires the orientation of the vehicle 10 from an azimuth sensor (not shown).

Where any one from an intersection, a traffic signal, and a temporary stopping position is close in front in the advance direction of the vehicle on the travel route, the navigation device 32 can set a stopping position immediately in front of the intersection or traffic signal, or a temporary stopping position as the target stopping position of the vehicle 10. The navigation device 32 may also acquire traffic infrastructure-related information including red signal information of a traffic light, and set the stopping position immediately in front of the traffic light as a target stopping position when the traffic light in front of the vehicle is red. The traffic infrastructure-related information is referred to hereinbelow as "infra information". For example, the infra information can be received by radio waves from an external transmission facility. The infra information may also include the traffic light position and traffic jam information. The navigation device 32 transmits a signal representing the information including the present position and target stopping position to the control unit 50 by a controller area network (CAN) communication line.

The display unit 35 is a display and has a function of notifying the driver of the execution of the below-described regeneration amount enlargement control, during the execution thereof, by displaying a predetermined display representing the execution thereof. The display and non-display of the display unit 35 are controlled by the control unit 50.

The control unit 50 is also called an electric control unit (ECU) and includes a microcomputer having a central processing unit (CPU) and a storage unit having a memory. In the example shown in FIG. 1, the control unit 50 is shown as a single control unit, but the control unit 50 may be configured to be divided, as appropriate, into a plurality of constituent elements which are connected to each other by signal cables. The control unit 50 has an engine control unit 52 controlling the engine 18, a MG control unit 54 controlling the first MG 22 and the second MG 24, a regeneration amount enlargement control unit 56, and a regeneration amount enlargement restriction unit 58. The regeneration amount enlargement control unit 56 and the regeneration amount enlargement restriction unit 58 are explained hereinbelow.

The engine control unit 52 generates a control signal Si1 outputted to the engine 18. The MG control unit 54 generates the control signal Si2 outputted to the inverter unit 26. When a DC/DC converter is used, the operation of the DC/DC converter is also controlled by the control signal Si2.

The control unit 50 controls the drive of the engine 18, the first MG 22, and the second MG 24 in response to the running required output Preq based on the accelerator pedal operation as an operation performed by the driver. More specifically, the control unit 50 calculates a running required torque Tr*, which is required for running, by using a map or relationship equation which has been stored in advance based on the accelerator position AP and vehicle speed Vc. The running required torque Tr* is a torque outputted to the output shaft 36. The control unit 50 calculates the running required power Preq from the running required torque Tr* and the revolution speed of the second MG 24 itself, or the revolution speed of the output shaft 36, which is the revolution speed calculated from the revolution speed of the second MG 24. The control unit 50 controls the drive of the engine 18, the first MG 22, and the second MG 24 such that the running required power Preq is outputted to the output shaft 36.

The control unit 50 calculates as a target engine output Pe* an output obtained by adding a charge-discharge required output for bringing the SOC of the battery 28 close to a reference SOC to the running required power Preq, and then calculates a target revolution speed Ne* and a target torque Te* of the engine 18 from a predetermined engine high-efficiency map. The control unit 50 calculates a target revolution speed Vm1* and a target torque Tr1* of the first MG 22 and a target torque Tr2* of the second MG 24 by using a predetermined relationship equation from the target revolution speed Ne* of the engine 18, the detected values of the revolution speed Vm1 of the first MG 22 and the revolution speed Vm2 of the second MG 24, and the running required torque Tr*. The target revolution speed Ne* and the target torque Te* of the engine 18, the target revolution speed Vm1* and a target torque Tr1* of the first MG 22, and target torque Tr2* of the second MG 24 may be calculated from a map stored in a storage unit (not shown) based on the accelerator position AP, or the accelerator position AP and the vehicle speed Vc.

The control unit 50 outputs the calculated target revolution speed Ne* and target torque Te* of the engine 18 to the engine control unit 52, and the engine control unit 52 controls the drive of the engine 18 by the control signal Si1 such as to obtain the target revolution speed Ne* and the target torque Te*. The control unit 50 also outputs the calculated target revolution speed Vm1* and target torque Tr1* of the first MG 22 and the calculated target torque Tr2* of the second MG 24 to the MG control unit 54, and the MG control unit 54 controls the drive of the first MG 22 and the second MG 24 by the control signal Si2 such as to obtain the target revolution speed Vm1*, target torques Tr1*, Tr2*.

As a result, when the operation amount of the accelerator pedal is small or the vehicle speed Vv is low, where the engine 18 has stopped, the vehicle runs by using only the second MG 24 as a drive source. Further, when the SOC is lower than the reference SOC, the control unit 50 enables power generation by the first MG 22 by driving the engine 18, and charges the battery 28 with the generated power.

When the operation amount of the accelerator pedal is large and the vehicle speed Vv is high, the engine 18 is driven, and the vehicle runs using the engine 18 as a drive source. In this case, the control unit 50 drives, as necessary, the second MG 24 together with the engine 18, thereby allowing the vehicle to run using both the engine and the second MG as the drive sources.

The regeneration amount enlargement control unit 56 acquires the route information including the present position and target stopping position from the navigation device 32. The regeneration amount enlargement control unit 56 predicts or sets the target stopping position, which is the position at which the vehicle is stopped and decelerated by the driver's operation in the travel route, and the below-described deceleration start position based on the route information, and controls the regenerative power generation by the second MG 24. The regeneration amount enlargement control unit 56 thus performs the regeneration amount enlargement control which enlarges the regeneration power amount that can be charged into the battery 28 before the target stopping position.

Figure 2:
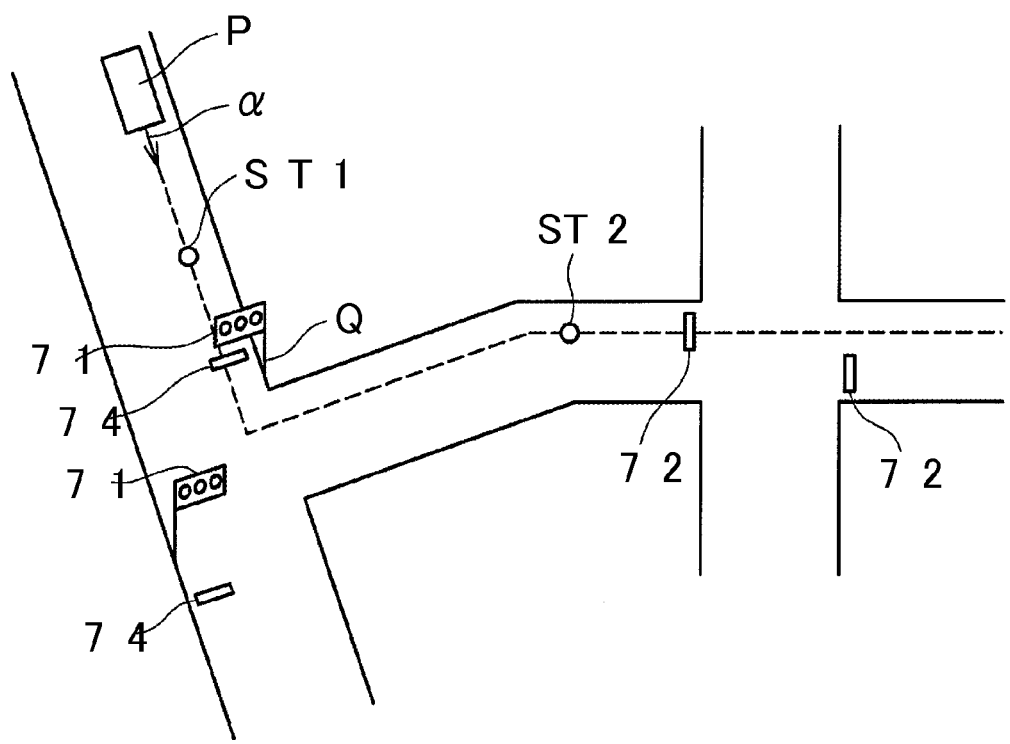
FIG. 2 shows the relationship between a deceleration start position and a target stopping position on a preset route stored in a navigation device in the vehicle shown in FIG. 1.

FIG. 2 shows the relationship between the target stopping position on the travel route that is stored in the navigation device 32 and the deceleration start position. In FIG. 2, the travel route is set, as shown by a broken line, and traffic lights 71 and temporary stopping positions 72 are set on the travel route in the route information stored in the navigation device 32. In this case, where the present position is denoted by P and the vehicle 10 advances in the direction shown by an arrow a, a stopping line 74 immediately before the traffic light 71 at the position Q, which is the closest to the present position, is set as the target stopping position.

The navigation device 32 may have a function of learning the positions of stopping and decelerating the vehicle by the driver's operation. For example, the navigation device 32 may have a learning function of storing a specific stopping position including a temporary stopping position at which the vehicle is stopped at a certain or higher frequency by the driver's operation, and a deceleration start position immediately preceding this stopping position, and may set the specific stopping position as the target stopping position when the specific stopping position is in front of the present position. The control unit 50 acquires information including the target stopping position and present position from the navigation device 32.

The regeneration amount enlargement control unit 56 sets a deceleration start position (ST1) for increasing the regenerative power generated by the second MG 24 that can be recovered in the battery 28 before the predicted target stopping position by using the preset relationship equation or map from the acquired target stopping position and present position and the detected vehicle speed based on route information. The regeneration amount enlargement control unit 56 also calculates the deceleration setting point td, which is a time at which the regenerative power generation is increased after the deceleration start position, and a regenerative torque corresponding to the regenerative power generation that is increased from the deceleration setting point td. Based on the calculated deceleration setting point td and regenerative torque, the regeneration amount enlargement control unit 56 performs control such as to increase the regenerative power generation in the second MG 24, the precondition therefor being that the driver does not operate the accelerator pedal, that is, that the vehicle is not accelerated. In this case, the regeneration amount enlargement control unit 56 controls the second inverter. Instead of being determined by the control unit 50, the deceleration setting point td and the deceleration start position may be estimated by the navigation device 32 and transmitted to the control unit 50.

When the navigation device 32 has the function of learning the stopping and deceleration positions of the vehicle by the driver's operation, the regeneration amount enlargement control may be performed based on the learning result. When the navigation device 32 has the function of acquiring the infra information, the regeneration amount enlargement control may be performed based on the infra information.

Figure 3:
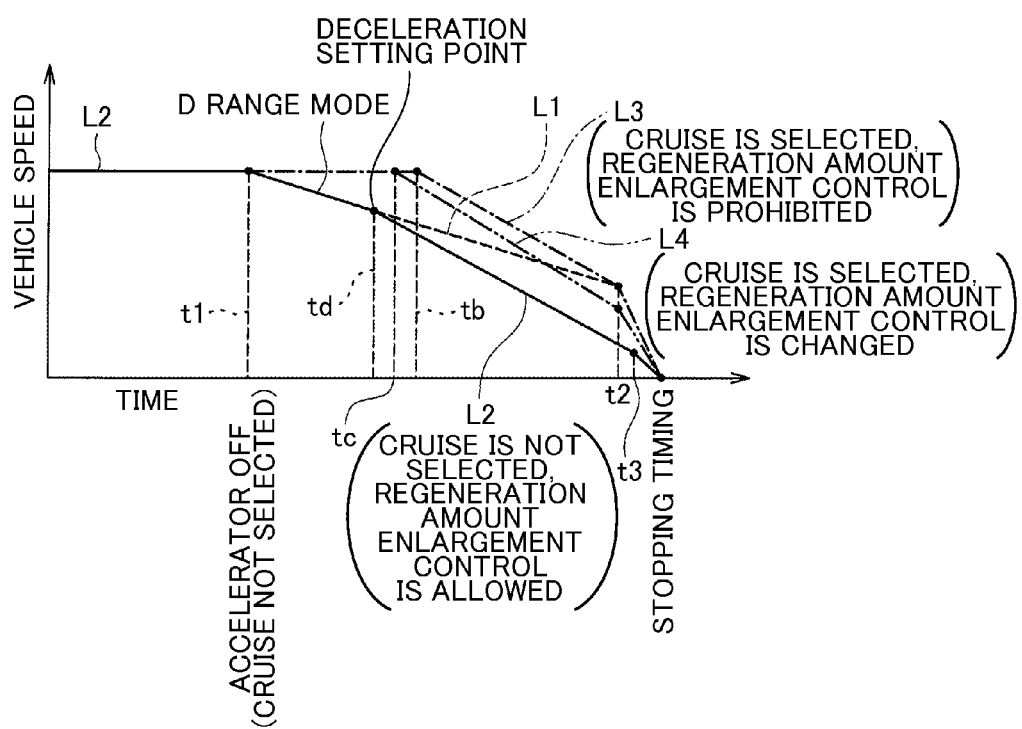
FIG. 3 shows how the vehicle speed decreases when the regeneration amount enlargement control is allowed, prohibited, and changed in the case in which the vehicle shown in FIG. 1 is stopped at the target stopping position.

FIG. 3 shows the states of vehicle speed decrease by comparing the cases in which the regeneration amount enlargement control is allowed and prohibited when the vehicle 10 is stopped at the target stopping position. In FIG. 3, a broken line L1 shows the deceleration state in the case in which the regeneration amount enlargement control is assumed not to be performed when the vehicle runs in the D range mode. In this case, none of the CR mode, ASL mode, and IPA mode is selected. Before the deceleration setting point td, the broken line L1 coincides with a solid line L2 representing the case in which the regeneration amount enlargement control is allowed. In such a case, the driver releases the accelerator pedal at a time t1, and then the driver depresses the brake pedal at a time t2 and stops the vehicle 10 at a stopping point of time corresponding to the target stopping position.

For example, where the brake pedal is depressed at the time t2 when the regeneration amount enlargement control is not performed, as shown by the broken line L1, since the vehicle speed is high during the depression of the brake pedal, the degree of deceleration from t2 to the stopping time becomes large. The amount of power obtained by regenerative power generation in the second MG 24 increases with the increase in a degree of deceleration, which is a degree to which the vehicle speed decreases over a predetermined time period, but there is an allowable upper limit for the charging rate, which is the rate at which power can be supplied to the battery 28. Therefore, where the degree of deceleration exceeds a predetermined value corresponding to the allowable upper limit, useless power is generated that cannot be charged into the battery 28, and there is still room for improvement in terms of increasing the fuel efficiency.

The broken line L1 relates to the case in which the regeneration amount enlargement control is not performed, whereas the solid line L2 in FIG. 3 relates to the case in which the regeneration amount enlargement control is allowed. In this case, the regeneration amount enlargement control unit 56 controls the regenerative power generation by controlling the second inverter in a manner such that after the deceleration setting point td, the regenerative torque of the second MG 24 is increased over previous regenerative torques and the degree of deceleration is increased. In this process, the braking torque corresponding to the engine brake acting in the direction of decelerating the vehicle 10 increases. For this reason, since the vehicle speed decreases rapidly and comparatively smoothly due to a comparatively rapid increase in the degree of deceleration, the driver is not required to depress strongly the brake pedal at the time t3 and the speed of the vehicle 10 does not decrease abruptly even immediately prior to stopping. Therefore, the regeneration power amount that can be charged into the battery 28 can be enlarged and fuel efficiency can be increased.

The regeneration amount enlargement control unit 56 sets the deceleration setting point td such that the estimated value of the degree of deceleration when the brake pedal is depressed becomes a predetermined value that is less than the degree of deceleration corresponding to the allowed upper limit of the charging rate of the battery 28. In order to avoid deceleration that is not intended by the driver, the accelerator pedal being not depressed by the driver becomes a precondition for executing such regeneration amount enlargement control. Further, the value of such degree of deceleration and the deceleration setting point td differ depending on the vehicle speed. For example, as the vehicle speed increases, the deceleration setting point td should be set at a position closer to the present position. For this reason, the regeneration amount enlargement control unit 56 calculates the deceleration setting point td based on the detected vehicle speed, present position, and target stopping position, calculates the regenerative torque corresponding to the increased regenerative power generation from the deceleration setting point td, and controls the regenerative power generation in the second MG 24.

With such regeneration amount enlargement control, the regeneration amount that can be changed into the battery 28 increases close to the stopping position where the vehicle is predicted to stop based on route information, and when the accelerator is OFF, and therefore fuel efficiency can be increased. Further, since the regeneration amount is not enlarged when the accelerator is OFF outside the vicinity of the stopping position in the travel route, the vehicle can be decelerated close to the driver's intention.

Further, the regeneration amount enlargement restriction unit 58 restricts the regeneration amount enlargement control when executing a predetermined vehicle speed adjustment mode, which is selected by intentional input from the driver and in which the vehicle 10 is run with automatic adjustment of vehicle speed, by comparison with when the vehicle speed adjustment mode is not selected. The "restriction of regeneration amount enlargement control", as referred to herein, may be prohibition of the regeneration amount enlargement control or change of the regeneration amount enlargement control. The "change of the regeneration amount enlargement control", as referred to herein, is performed to bring the start position of the regeneration amount enlargement closer to the stopping time, or to decrease the degree of regeneration amount enlargement by comparison with that performed when the vehicle speed adjustment mode is not selected.

Figure 4:
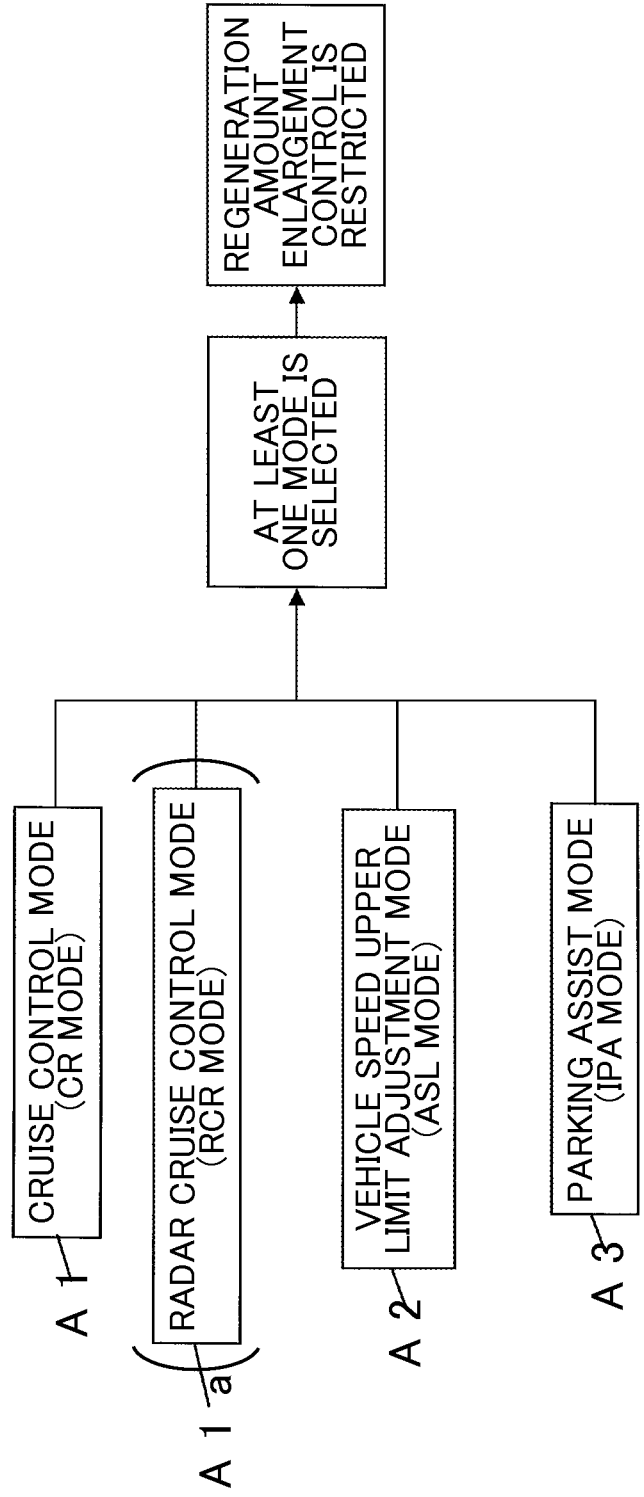
FIG. 4 is a block diagram showing the conditions for restricting the regeneration amount enlargement control in the vehicle shown in FIG. 1.

FIG. 4 shows a condition for restricting the regeneration amount enlargement control. The regeneration amount enlargement restriction unit 58 restricts the regeneration amount enlargement control when at least one of the CR mode (A1), which is the predetermined vehicle speed adjustment mode, ASL mode (A2), which is a separate predetermined vehicle speed adjustment mode, and the IPA mode (A3) is selected.

When the CR mode A1 is selected by the driver, the control unit 50 uses the detected value of the vehicle speed when the driver does not operate the accelerator pedal or brake pedal, controls the drive of at least either of the engine 18 and the second MG 24 such as to maintain automatically the vehicle speed that has been set by the first lever, and automatically adjusts the vehicle speed. Even where the CR mode has been selected, the control unit 50 cancels the selection of the CR mode when the driver depresses the accelerator pedal or brake pedal at or in excess of a predetermined degree.

When the ASL mode A2 is selected, the control unit 50 uses the detected value of the vehicle speed, controls the drive of the engine 18 and the second MG 24 such that the detected value of the vehicle speed does not exceed the upper limit vehicle speed that has been set by the second lever, and automatically adjusts the vehicle speed. During the execution of the ASL mode, even where the accelerator pedal is depressed by the driver in the vicinity of the upper limit vehicle speed, the control unit 50 controls the drive of at least either of the engine 18 and the second MG 24 such as to maintain the vehicle speed at the upper limit vehicle speed, in the same manner as during the execution of the CR mode.

When the IPA mode A3 is selected, the control unit 50 displays "PARALLEL PARKING" or "PARKING IN A GARAGE", which can be selected by a touch operation, on the image display unit. Where "PARALLEL PARKING" is selected by the touch operation, the control unit 50 controls the actuation of an electric power steering apparatus (EPS) (not shown) such that the parallel parking performed by the driver is assisted by the automatic operation of the steering wheel. When "PARKING IN A GARAGE" is selected, the control unit 50 controls the EPS actuation such that parking in a garage performed by the driver is assisted by the automatic operation of the steering wheel.

For example, when "PARALLEL PARKING" is selected, the control unit 50 allows the user to establish a parking frame displayed with superposition on the image captured by the camera and displayed on the image display unit. The parking frame can be moved and adjusted on the captured image. The control unit 50 controls the EPS such as to guide the vehicle into the established parking frame. Where the vehicle speed has deviated from the predetermined range, the control unit 50 cancels the selection of the IPA mode in either of the parallel parking and parking in a garage.

Figure 5:
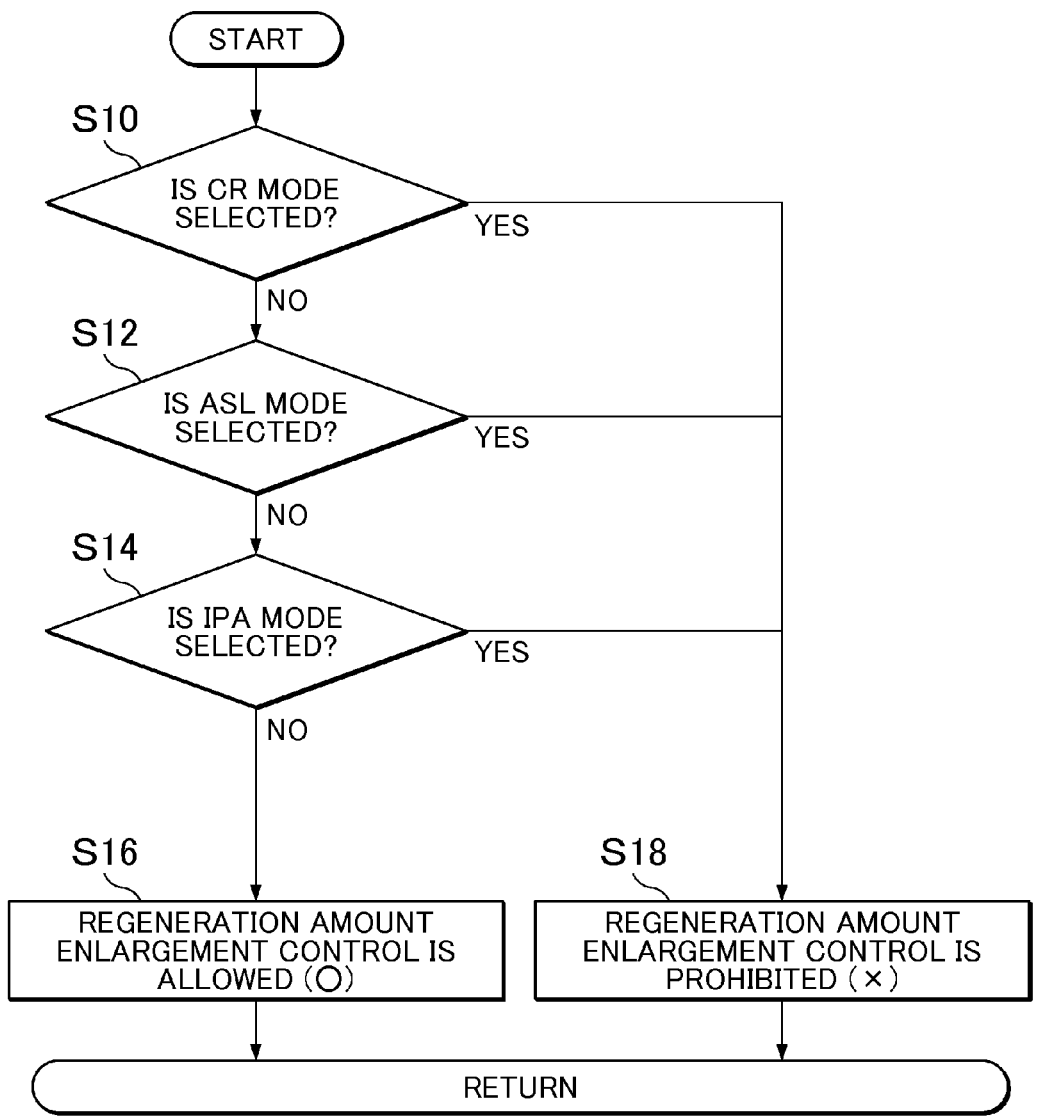
FIG. 5 is a flowchart illustrating a method for determining whether or not to execute the regeneration amount enlargement control according to the mode selection in the vehicle shown in FIG. 1.

FIG. 5 shows a flowchart illustrating a method for determining whether or not to execute the regeneration amount enlargement control correspondingly to a mode selection. The flowchart shown in FIG. 5 is executed by executing the program stored in the storage unit of the control unit 50. First, in step S10 ("step S" is referred to hereinbelow simply as "S"), it is determined whether or not the CR mode has been selected. Where it is determined in S10 that the CR mode has not been selected, it is determined in S12 whether or not the ASL mode has been selected.

Where it is determined in S12 that the ASL mode has not been selected, it is determined in S14 whether or not the IPA mode has been selected. Where it is determined that the IPA mode has not been selected, the regeneration amount enlargement control is allowed in S16. In this case, for example, as shown by the solid line L2 in FIG. 3, the regeneration amount enlargement control is executed such that the degree of deceleration of the vehicle increases after the deceleration setting point td following the accelerator OFF by the driver. With such control, the amount of regenerative power that can be charged into the battery 28 can be enlarged and fuel efficiency can be increased.

Meanwhile, where the determination result in any of S10, S12, and S14 in FIG. 5 is positive, the regeneration amount enlargement control is prohibited in S18. For example, where the CR mode has been selected, the regeneration amount enlargement control is not executed even after the deceleration setting point td, regardless of the ON/OFF state of the accelerator pedal, as shown by the dash-dot line L3 in FIG. 3.

In this case, the CR mode is canceled by the driver depressing the brake pedal at the time tb, the vehicle speed decreases, and the vehicle is rapidly decelerated and stopped by the driver further depressing the brake pedal at the time t2. The processing sequence of S10, S12, and S14 may be changed as appropriate.

As the restriction of the regeneration amount enlargement control in S18 in FIG. 5, the regeneration amount enlargement control can be also changed, instead of being prohibited, so that the start of regeneration amount enlargement is brought closer to the stopping position than in the case in which the predetermined vehicle speed adjustment mode is not selected. In this case, for example, as shown by a two-dot-dash line L4 in FIG. 4, the deceleration setting point is changed from td to tc, as compared with the case represented by the solid line L2. As a result, the regeneration amount enlargement control is restricted in time by comparison with the case in which the regeneration amount enlargement control represented by the solid line L2 is executed.

Thus, when the predetermined vehicle speed adjustment mode is not selected, the fuel efficiency can be improved by performing the regeneration amount enlargement control. Furthermore, when the predetermined vehicle speed adjustment mode is selected and executed, the regeneration amount enlargement control is restricted by comparison with the case in which the predetermined vehicle speed adjustment mode is not selected. Therefore, it is possible to inhibit the cancelation of the selection of the predetermined vehicle speed adjustment mode when such selection is made, and to suppress the accidental deceleration unintended by the driver. For example, when a certain vehicle speed is maintained automatically when the accelerator is OFF in the selected CR mode, sudden cancelation of the CR mode, execution of the regeneration amount enlargement control, and automatic deceleration of the vehicle can be prevented. Therefore, it is possible to suppress the discomfort that can be caused to the driver.

Referring to FIG. 1, in the above-described embodiment, the vehicle can be provided with a radar cruise mode setting unit 46 and an inter-vehicle distance detection unit 48 instead of the CR mode setting unit 43. The radar cruise mode setting unit 46 is provided for selecting a radar cruise control mode, which is a predetermined vehicle speed adjustment mode.

In the radar cruise control mode, the vehicle speed is automatically adjusted such as to maintain the inter-vehicle distance between the host vehicle and the leading vehicle, which travels in front of the host vehicle, within a predetermined distance range. The radar cruise control mode is referred hereinbelow as an RCR mode, and the radar cruise mode setting unit 46 is referred to hereinbelow as an RCR mode setting unit 46.

Similarly to the CR mode setting unit 43, the RCR mode setting unit 46 sets the RCR mode with a lever (not shown) disposed on the periphery of the steering wheel. Selection and deselection of the RCR mode can be switched by ON/OFF switching a pushbutton-type switch provided at the distal end of the lever. When the distal end portion of the lever is operated, a signal representing an instruction to increase or decrease the set vehicle speed is transmitted to the control unit 50.

A signal VRset representing the ON/OFF state of the RCR mode setting unit 46 is transmitted to the control unit 50. The selection of the RCR mode is canceled when the accelerator pedal or brake pedal is depressed even when the RCR mode setting unit 46 is ON.

The inter-vehicle distance detection unit 48 has a sensor detecting the inter-vehicle distance from the host vehicle to the leading vehicle by using a milliwave radar or laser radar and transmits a signal representing the detected value to the control unit 50.

The control unit 50 performs the RCR mode when the RCR mode is selected by the driver and the set vehicle speed is set. In this case, the control unit 50 controls the drive of the engine 18 and the second MG 24 such as to match the actual vehicle speed with the set vehicle speed when the detected value of the inter-vehicle distance detection unit 48 is absent or the transmitted detected value is a distance exceeding a predetermined distance for adjustment.

Meanwhile, where the detected value transmitted from the inter-vehicle distance detection unit 48 is a distance within the predetermined distance for adjustment, the control unit 50 accelerates or decelerates the vehicle such as to maintain the inter-vehicle distance within the predetermined distance range.

In the vehicle in which such an RCR mode is performed, the regeneration amount enlargement control is inhibited or changed and the regeneration amount enlargement control is restricted by comparison with that performed when the predetermined vehicle speed adjustment mode is not selected, as the RCR mode is executed, in the same manner as in the vehicle in which the CR mode is performed. For example, referring to FIG. 4, the regeneration amount enlargement restriction unit 58 restricts the regeneration amount enlargement control when at least one of the RCR mode (A1a), ASL mode (A2), and IPA mode (A3) is selected.

Where the regeneration amount enlargement control is inhibited by the execution of any of the CR mode, ASL mode, IPA mode, and RCR mode, the control unit 50 may control the display unit 35 in a manner such that the predetermined display indicating the execution of the regeneration amount enlargement control on the display unit 35 is deleted during the execution of the mode. In this case, since the driver is not notified by the display unit 35 of the execution of the regeneration amount enlargement control, the driver can recognize that unintended deceleration caused by the regeneration amount enlargement control is not performed, and the vehicle behavior becomes close to that intended by the driver. The control unit 50 may also perform the control such as to display on the display unit 35 a second predetermined display indicating the prohibition or restriction of the regeneration amount enlargement control during the prohibition or restriction thereof.

The case in which the regeneration amount enlargement control is combined with at least one control from among plan switching control and charging target change control, which are the types of control different from the regeneration amount enlargement control, in the embodiment is explained below. In this case, referring to FIG. 1, the control unit 50 has a mode switching control unit 62 and a charging target change control unit 64. The control unit 50 may be also configured to have only either of the mode switching control unit 62 and the charging target change control unit 64.

First, the basic mode switching in a HV is explained, and then the mode switching control unit 62 is explained. The HV 10 has a HV mode and an EV mode as running modes. The "HV mode", as referred to herein, is also referred to as a CS mode and is a mode in which the vehicle runs using at least either of the engine 18 and the second MG 24 as a drive source. In the HV mode, the control is performed, as the vehicle runs, by switching between execution and non-execution of the drive of the engine 18 and the second MG 24, power generation in the first MG 22 by the engine drive, and regenerative power generation in the second MG 24 during the control, such as to maintain the present SOC at the time of switching from the below-described EV mode to the HV mode, or the SOC within a predetermined range centered on the present SOC. For example, when the present SOC is lower than the lower limit of the predetermined range, power is generated in the first MG 22 by the drive of the engine 18, and the generated power is charged into the battery 28. Conversely, where the present SOC exceeds the upper limit of the predetermined range, the engine 18 is stopped, and the charged power of the battery 28 is consumed by the drive of the second MG 24.

The "EV mode" is also referred to as a CD mode and is a mode in which the vehicle runs using only the second MG 24 as a drive power source. In the EV mode, power is actively consumed by the second MG 24, without maintaining the SOC of the battery 28, as the vehicle runs. In this case, the engine 18 is not driven. In the EV mode, when the operation amount of the accelerator pedal is large or the vehicle speed is high, it is also possible to run the vehicle by also using the output of the engine 18 in order to ensure the output required to run the vehicle. In this case, the battery 28 is also not charged by the drive of the engine 18.

The control unit 50 selects the EV mode on a precondition that a predetermined EV mode start condition is fulfilled, and controls the engine 18, the first MG 22, and the second MG 24 so as to run the vehicle in the EV mode till the SOC becomes equal to or lower than a "HV mode threshold", which is a value lower than the EV mode threshold. As a result, after the execution of the EV mode, a transition is made to the HV mode in a state in which the SOC is decreased to or below a predetermined value, as shown by "NO CONTROL" in the below-described FIGS. 7B and 7C. Described above is the basic mode switching.

The "EV mode start condition", as referred to herein, can be a condition that the present SOC is equal to or higher than the preset "EV mode threshold", the battery temperature is within a predetermined temperature range, and a battery outputable power is equal to or greater than a predetermined value. The switching of the EV mode and HV mode is not limited to being executed automatically in the vehicle. Thus the driver may manually switch the modes by operating an EV-HV switch (not shown).

Where the present SOC is equal to or greater than the EV mode threshold, the mode switching control unit 62 creates and stores in the storage unit a predetermined travel plan such as to switch the HV mode and EV mode based on the route information including the present position acquired from the navigation device 32, destination, and travel route to the destination. The "travel plan", as referred to herein, is created such as to increase the "EV running efficiency", which is the below-described vehicle efficiency. The mode switching control unit 62 performs the mode switching control based on this travel plan.

More specifically, the mode switching control unit 62 determines a plurality of continuous route elements in the travel route, which leads the vehicle to the destination, based on the acquired route information. The mode switching control unit 62 creates the travel plan such that the EV running efficiency calculated from the preset relationship increases in the plurality of route elements. In this case, the travel plan is created with an emphasis on increasing the EV running efficiency in the future travel route.

Figure 6:
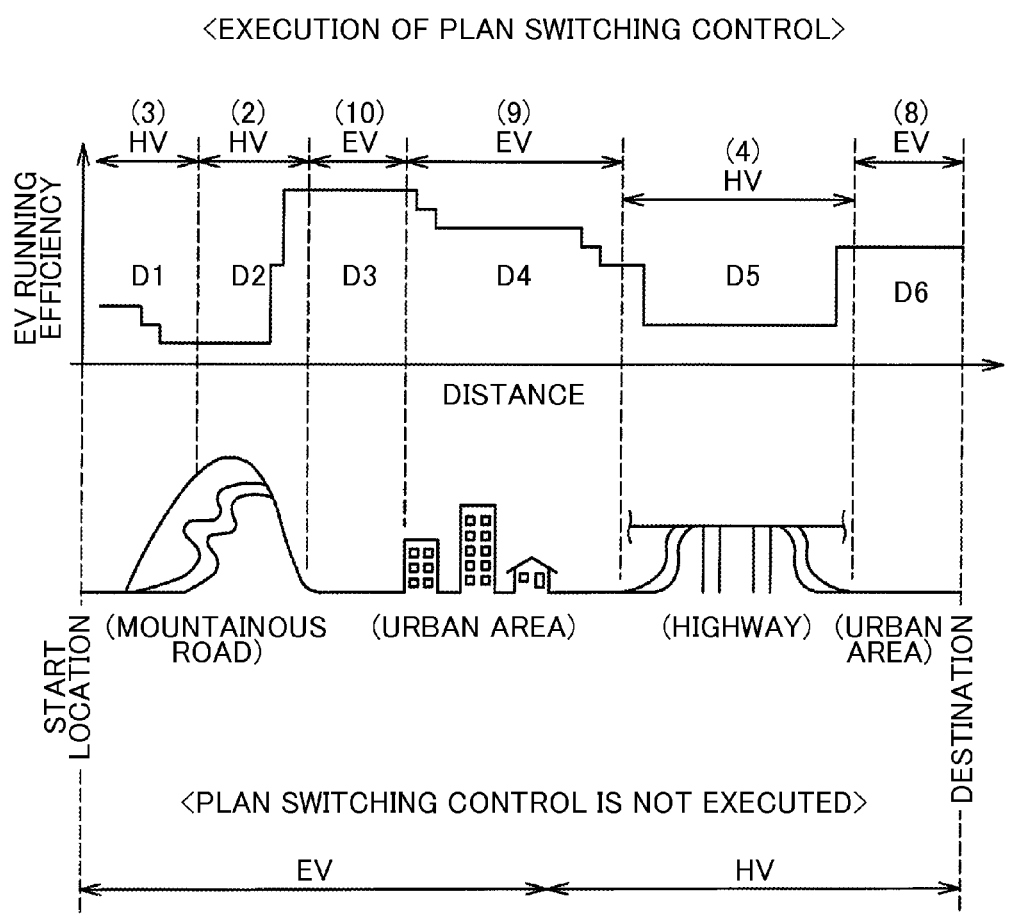
FIG. 6 shows mode switching when the plan switching control, which is switching control based on a travel plan, is executed (upper side in the figure) and when the plan switching control is not performed (lower side in the figure) in the vehicle shown in FIG. 1.

This procedure is explained below in greater detail with reference to FIG. 6. FIG. 6 illustrates mode switching between the case in which plan switching control, which is switching control based on the travel plan, is executed (shown on the upper side in FIG. 6) and the case in which the plan switching control is not performed (shown on the lower side in FIG. 6). In FIG. 6, a travel route is set, by way of example, from a start location to the destination, such as to travel by a mountainous road, an urban area, and a highway. The travel route is divided into a plurality of continuous route elements D1, D2, . . . D6 based on a preset condition.

The control unit 50 calculates a predicted average vehicle speed and a predicted load applied to the vehicle during running from the road grade and legal speed limit in each of the route elements D1, D2, . . . D6, and stores the calculation results. The control unit 50 calculates and stores the "EV running efficiency", which is the vehicle efficiency corresponding to energy efficiency when the vehicle is in the EV running mode, for each of the route elements D1, D2, . . . D6. The "EV running efficiency" is calculated by a predetermined relationship formula based on the predicted average vehicle speed and predicted load. The EV running efficiency increases with the decrease in the predicted average vehicle speed and decreases with the increase in the predicted average vehicle speed. The EV running efficiency increases with the decrease in the predicted load and decreases with the increase in the predicted load.

In the control unit 50, map data representing the relationship between the EV running efficiency, predicted average vehicle speed, and predicted load are stored in advance in the storage unit of the control unit 50. The control unit 50 calculates the predicted average vehicle speed and predicted load in the plurality of route elements D1, D2, . . . D6 from the route information acquired from the navigation device 32, and calculates the respective EV running efficiency from the map data.

In the case of plan switching control execution shown on the upper side in FIG. 6, each route element has a number of points, such as (3), (2) . . . , which is set to increase with the increase in the EV running efficiency. On a mountainous road where the load increases and on a highway where the vehicle speed increases, as shown on the upper side in FIG. 6, the EV running efficiency is low. Therefore, the number of points is as low as (3), (2), and (4). Meanwhile, in the urban area where the vehicle speed is low and the road grade is small, the EV running efficiency is high. Therefore, the number of points is as high as (10), (9), and (8).

The mode switching control unit 62 selects one or a plurality of route elements in the order of decreasing efficiency from the route element (for example, D3) with the highest EV running efficiency, which has the highest number of points, and creates a travel plan such that the EV mode is set for the selected route elements (for example, D3, D4, D6) and the HV mode is set for the remaining route elements (for example, D1, D2, D5). With such a travel plan, where the EV mode is executed in all of the selected route elements (for example, D3, D4, D6), the difference between the SOC remaining in the start location and the SOC of the HV mode threshold is utilized to the fullest. It is preferred that in the travel plan, the difference between the SOC remaining in the start location and the SOC of the HV mode threshold be utilized to the fullest immediately before the destination.

The mode switching control unit 62 performs the plan switching control of switching, at a predetermined timing, the HV mode and EV mode in the travel route to the destination based on the created travel plan.

Figure 7:
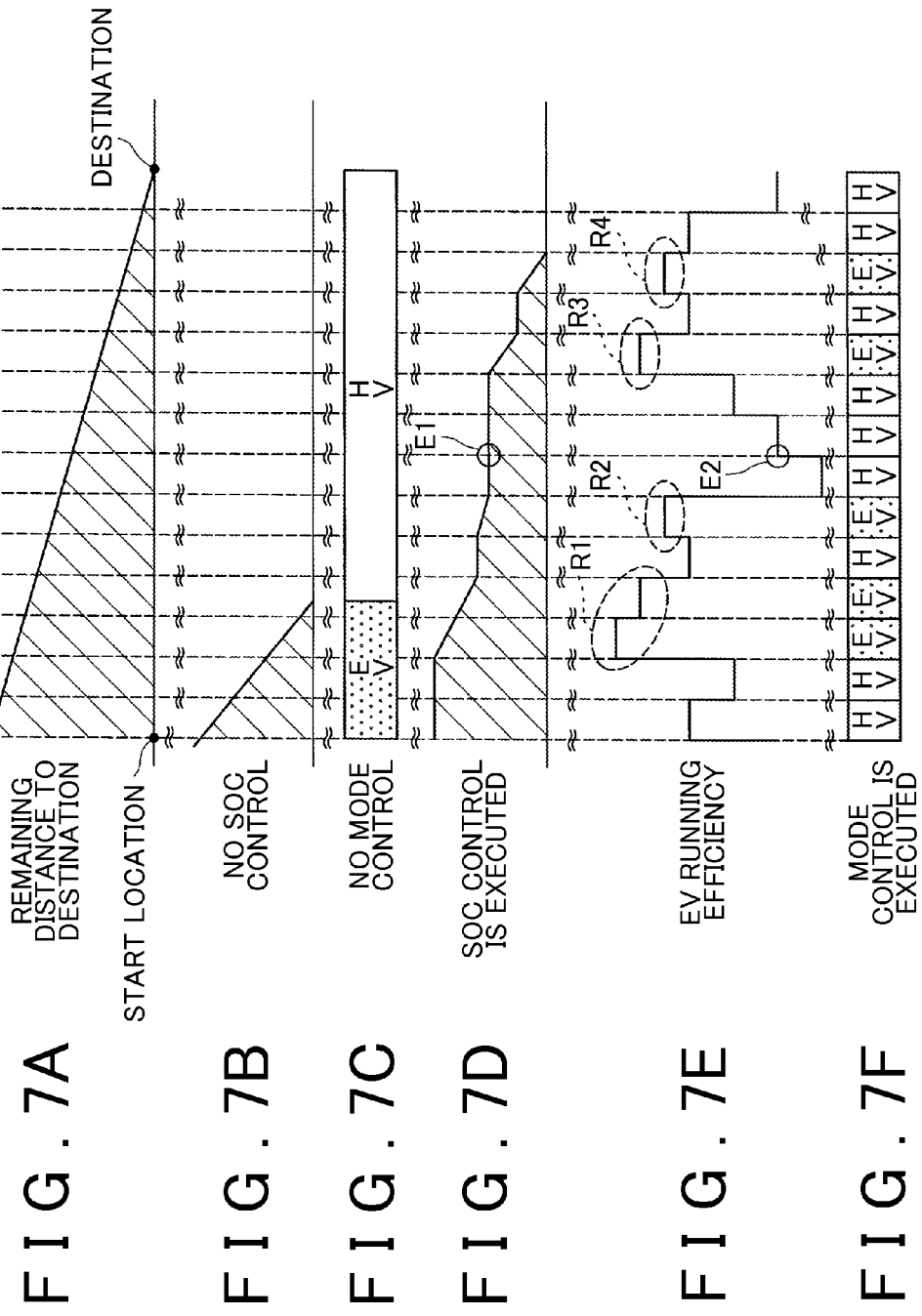
FIG. 7A shows the remaining distance from the start location to the destination for the vehicle shown in FIG. 1.
FIG. 7B shows a SOC, which is a residual charge amount, in the case in which the plan switching control is not executed in the vehicle shown in FIG. 1.
FIG. 7C shows a running mode in the case in which the plan switching control is not executed in the vehicle shown in FIG. 1.
FIG. 7D shows the SOC in the case in which the plan switching control is executed in the vehicle shown in FIG. 1.
FIG. 7E shows the EV running efficiency in the vehicle shown in FIG. 1.
FIG. 7F shows a running mode in the case in which the plan switching control is executed in the vehicle shown in FIG. 1.

FIGS. 7A to 7F show the remaining distance from the start location to the destination (FIG. 7A), the SOC in the case in which the plan switching control is not executed (FIG. 7B), the running mode (FIG. 7C), the SOC in the case in which the plan switching control is executed (FIG. 7D), the EV running efficiency (FIG. 7E), and the running mode in the case in which the plan switching control is executed (FIG. 7F). FIG. 7 (FIGS. 7B and 7C) show the basic mode switching.

As shown in FIGS. 7A to 7F, a travel route is set from the start location to the destination, and where the plan switching control is not executed when the SOC at the destination fulfills the predetermined EV mode start condition, a transition to the HV mode is made, as shown in FIGS. 7B and 7C in a state in which the SOC decreases to a value equal to or lower than the predetermined EV mode threshold after the EV mode starts.

Meanwhile, the control unit 50 creates the travel plan for performing mode switching shown in FIG. 7F based on the EV running efficiency shown in FIG. 7E. In this case, the route elements corresponding to the portions surrounded by the broken lines R1, R2, R3, R4 in FIG. 7E are selected as portions with a high EV running efficiency and set as the EV mode. The HV mode is set for the remaining route elements.

The mode switching control unit 62 executes the plan switching control based on the travel plan. In this case, as shown in FIG. 7D, when the vehicle travels towards the destination, the SOC is maintained at a substantially constant level in the HV mode, the SOC gradually decreases in the EV mode, and this behavior is repeated till the destination is reached. In this case, the SOC before the HV mode threshold, which is the SOC remaining at the start location, is utilized to the fullest immediately before the destination. Therefore, the fuel efficiency of the vehicle is improved.

The charging target change control unit 64 (FIG. 1) is explained below. The charging target change control unit 64 acquires route information including the present position and the specific slope position having a grade equal to or greater than a predetermined value from the navigation device 32. The charging target change control unit 64 performs charging target change control of changing the control target value of SOC of the battery 28 on the basis of the information on the specific downhill road position in the travel route.

Figure 8:
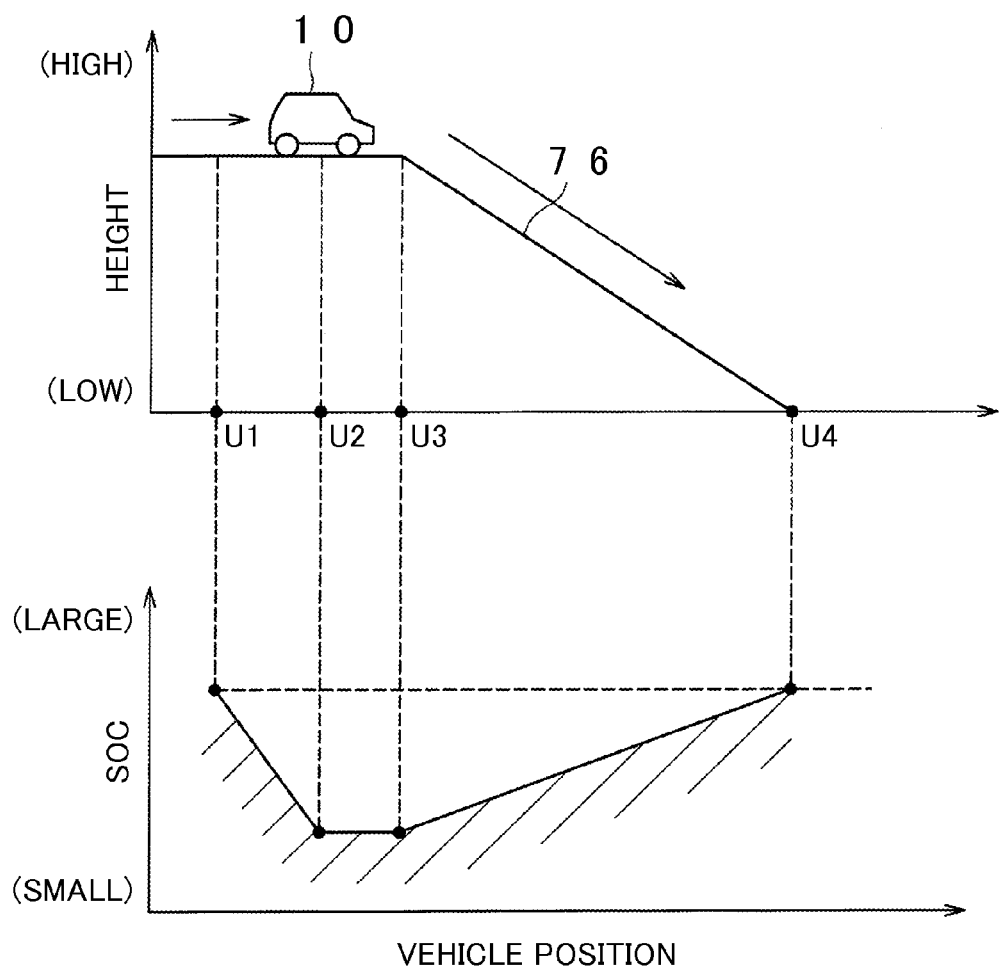
FIG. 8 shows the relationship between a specific downhill road, a vehicle position, and SOC corresponding to the vehicle position when the charging target change control is performed in the vehicle shown in FIG. 1.

FIG. 8 shows the relationship between a specific downhill road 76 on the travel route, vehicle position, and SOC corresponding to the vehicle position when the charging target change control is performed. When the vehicle descends the specific downhill road 76 by traveling in the direction shown by the arrow in FIG. 8, the SOC is rapidly increased by regenerative power generation in the second MG 24 resulting from the accelerator OFF. Meanwhile, where the SOC is sufficiently high when the vehicle 10 is positioned before the specific downhill road 76, the generated power obtained in traveling on the specific downhill road 76 cannot be sufficiently recovered by the battery 28 and can be wasted.

The charging target change control unit 64 executes the control such as to perform the EV running which actively causes the drive of the second MG 24 so as to decrease the reference SOC, which is the control target value of the SOC, to or below a predetermined value when the vehicle 10 is within a specific range before the specific downhill road 76 as determined from the obtained present position and the specific downhill road 76. As a result, the SOC can be sufficiently decreased within a range from a position U1 and a position U2 of the vehicle, and power obtained by regenerative power generation from a position U3, which is the start position of the specific downhill road 76, to a position U4, which is the end position thereof, can be sufficiently recovered by the battery 28. Therefore, the vehicle can run with a high efficiency.

The control unit 50 may be also configured to acquire infra information including traffic jam information having a traffic jam position from the navigation device 32 and perform the control such as to decrease the reference SOC to or below a predetermined value, in the same manner as in the case of the specific downhill road 76, when the vehicle 10 is within a predetermined range before the traffic jam position. In this case, the vehicle is also decelerated at the traffic jam position, and therefore, the power obtained by regenerative power generation can be sufficiently recovered by the battery 28.

The HV 10 can be configured to include either or both of the mode switching control unit 62 and the charging target change control unit 64. In this case, the control unit 50 performs either or both of the plan switching control and charging target change control while restricting the regeneration amount enlargement control as the vehicle travels in the CR mode or ASL mode when the CR mode or ASL mode is selected.

Figure 9:
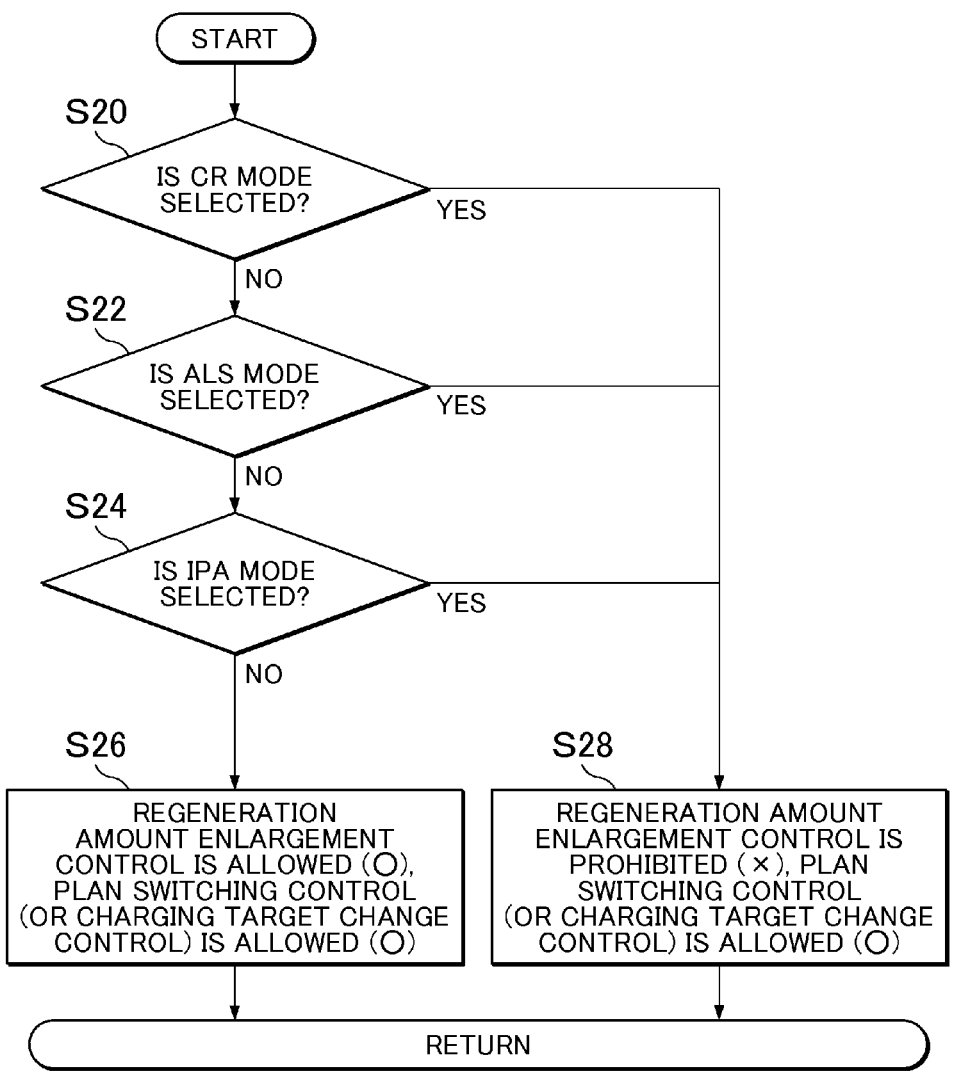
FIG. 9 is a flowchart showing a method for determining whether or not to execute the regeneration amount enlargement control and plan switching control (or charging target change control) in response to mode selection in the vehicle shown in FIG. 1; and
}

FIG. 9 is a flowchart showing a method for determining whether or not to execute the regeneration amount enlargement control and plan switching control (or charging target change control) in response to mode selection. In the case explained hereinbelow, only the plan switching control is performed, from among the plan switching control and the charging target change control, but whether or not to execute the control is similarly determined in the case of the charging target change control.

The control unit 50 can execute the method shown by the flowchart in FIG. 9 with the program that has been stored in advance in the storage unit. The processing from S20 to S24 is the same as the processing from S10 to S14 in FIG. 5. Where the IPA mode is determined not to be selected in S24 in FIG. 9, the execution of both the regeneration amount enlargement control and plan switching control is allowed in S26. Meanwhile, where any of the CR mode, ASL mode, and IPA mode is determined to be selected in S20, S22, and S24, the execution of the regeneration amount enlargement control is prohibited in S28, but the execution of the plan switching control is allowed.

With the abovementioned configuration, the target drive power of the vehicle is set such as to follow the request based on the operation of the accelerator pedal by the driver, and the degree of deceleration during the deceleration is not changed automatically, or the change thereof is small, in both the plan change control and the charging target change control. For this reason, even when any of the CR mode, ASL mode, and IPA mode is selected, there is little interference, in terms of control, between the selected mode and the plan change control or charging target change control. Therefore, by allowing the control performed by executing the selected mode and the plan change control or charging target change control, it is possible to improve fuel efficiency by the plan change control or charging target change control while bringing the behavior of the vehicle during the mode selection closer to that intended by the user.

In the above-described embodiment, the configuration of the vehicle equipped with a regenerative generator of the invention is not limited to that shown in FIG. 1, and for example a vehicle which is not a HV may be also used. For example, a simple generator, which does not have a function of an electric motor, can be also used as the generator.

Figure 10:
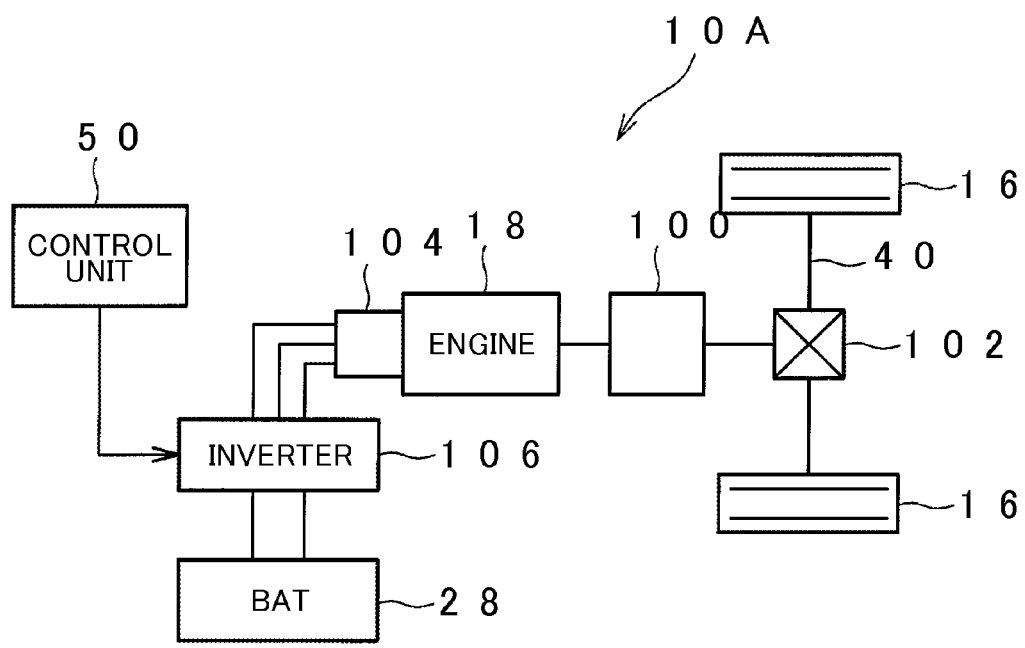
FIG. 10 shows the configuration of another vehicle equipped with a regenerative generator in which another embodiment of the invention is used.

Another embodiment of the invention is explained below. FIG. 10 shows the configuration of another vehicle 10A using the control system of the invention. The vehicle 10A is provided with the engine 18, a transmission 100, a differential device 102, and a generator 104. The vehicle 10A is not provided with a running motor. The power of the engine 18 is transmitted to the wheels 16 by the transmission 100, differential device 102, and shaft 40. The generator 104 is coupled to the rotating shaft of the engine 18, generates power by using the drive of the engine 18, and supplies the generated power to the battery 28 through an inverter 106. The generator 104 is a three-phase rotating electric machine similarly to the first MG 22 shown in FIG. 1. The control unit 50 controls the generation of power by the generator 104 by controlling the operation of the inverter 106.

When the vehicle 10A is braked, the power from the wheels 16 is transmitted to the generator 104 through the transmission 100 and the engine 18. In this case, the control unit 50 controls the regenerative torque of the generator 104 by controlling the inverter 106, whereby a regenerative braking force is generated in the wheels 16. Thus, the generator 104 functions as a regenerative generator. Similarly to the control unit 50 shown in FIG. 1, the control unit 50 has the regeneration amount enlargement control unit 56 and the regeneration amount enlargement restriction unit 58. The regeneration amount enlargement control unit 56 predicts the positions at which the vehicle will be stopped and decelerated by the driver's operations and controls the regeneration power generation in the generator 104 based on route information, thereby executing the regeneration amount enlargement control which enlarges the amount of regenerated power chargeable into the battery 28. As the predetermined vehicle speed adjustment mode selected by the driver is executed, the regeneration amount enlargement restriction unit 58 restricts the regeneration amount enlargement control by comparison with when the predetermined vehicle speed adjustment mode is not selected. The predetermined vehicle speed adjustment mode is implemented as indicated in the above embodiment.

The embodiments of the invention are explained above, but the invention is not limited to those embodiments, and obviously can be implemented in a variety of forms without departing from the essence of the invention. For example, in the configuration shown in FIG. 1, the control system 12 using the navigation device 32 is explained, but the navigation device may be omitted and the configuration may be used that has instead thereof a receiving unit that receives infra information including a traffic light position and red signal information on the traffic light as information relating to the route. When the red signal information on the traffic light which is in front of the vehicle is acquired from the infra information, the control unit 50 can acquire, by calculations, the position, which is assumed to be directly before the traffic light, as the target stopping position and can execute the regeneration amount enlargement control by using the distance to the target stopping position and the detected value of the vehicle speed.

Further, the control unit 50 may be also configured to have a function of performing a predetermined display with the display unit 35, such as to urge the driver to perform large deceleration after the deceleration setting point td when the regeneration amount enlargement control is performed. A notification unit that notifies of the execution state of the regeneration amount enlargement control is not limited to the display unit 35 and may be in the form of a sound output unit that notifies of the execution state of the regeneration amount enlargement control by sound.

Further, in the embodiments, the vehicle is configured to perform only one or two modes from among the CR mode, RCR mode, and ASL mode as the predetermined vehicle speed adjustment mode. The vehicle may be also configured not to perform the IPA mode.

The vehicle can be also provided with a charge residual amount enlargement switch (not shown), and when the driver switches ON the charge residual amount enlargement switch, the control unit 50 can execute the charging enlargement control and increase the SOC reference, which is the target residual amount of charge in the battery, over that when the charge residual amount enlargement switch is OFF. In this case, when the charge residual amount enlargement switch is ON, both the plan switching control and the charging target change control are strongly affected by the SOC. Therefore, the control unit 50 can prohibit both the plan switching control and the charging target change control. With such a configuration, it is possible to prevent the interference, in terms of control, between either or both of the plan change control and charging target change control and the charging enlargement control.

While the invention has been described with reference to example embodiments thereof, it is to be understood that the invention is not limited to the described example embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. A vehicle comprising:
   a power storage unit;
   a regenerative generator connected to the power storage unit, the regenerative generator being configured to implement regenerative power generation; and
   an electronic control unit configured to:
   (a) perform regeneration amount enlargement control in which positions of stopping and deceleration of the vehicle by input of driver's operations are predicted or set based on route information, the regenerative power generation by the regenerative generator being controlled in the regeneration amount enlargement control, a regeneration power amount charged into the power storage unit being enlarged in the regeneration amount enlargement control, and
   (b) restrict the regeneration amount enlargement control when executing a predetermined vehicle speed adjustment mode by comparison with when the vehicle speed adjustment mode is not selected, the vehicle running with automatic adjustment of vehicle speed in the predetermined vehicle speed adjustment mode selected by intentional input from the driver.

2. The vehicle according to claim 1, wherein
the electronic control unit is configured to perform the regeneration amount enlargement control based on a result obtained by learning positions at which the vehicle is stopped and decelerated by input of driver's operations.

3. The vehicle according to claim 1, wherein
the electronic control unit is configured to perform the regeneration amount enlargement control based on traffic infrastructure-related information.

4. The vehicle according to claim 1, wherein
the electronic control unit is configured to have an HV mode and an EV mode,
the electronic control unit is configured to create a predetermined travel plan so as to implement switching between the HV mode and the EV mode based on route information, and perform mode switching control based on the travel plan, and
the electronic control unit is configured to perform the mode switching control based on the travel plan while restricting the regeneration amount enlargement control in running in the predetermined vehicle speed adjustment mode when the predetermined vehicle speed adjustment mode is selected.

5. The vehicle according to claim 1, wherein
the electronic control unit is configured to perform control of changing a control target value of a residual charge amount in the power storage unit based on route information; and
the electronic control unit is configured to perform the control of changing the control target value of the residual charge amount while restricting the regeneration amount enlargement control in running in the predetermined vehicle speed adjustment mode when the predetermined vehicle speed adjustment mode is selected.

6. The vehicle equipped with a regenerative generator according to claim 1, further comprising:
   a display unit configured to display a first predetermined display representing execution of the regeneration amount enlargement control when the regeneration amount enlargement control is executed.

7. The vehicle according to claim 6, wherein
the display unit is configured to be controlled by the electronic control unit such that the first predetermined display is turned off during execution of the predetermined vehicle speed adjustment mode.

8. The vehicle according to claim 6, wherein during inhibition or restriction of the regeneration amount enlargement control the display unit is controlled by the electronic control unit such that a second predetermined display representing the inhibition or restriction is displayed.

* * * * *